C. G. MICHALIS.
WEIGHING SCALE.
APPLICATION FILED JUNE 9, 1915.

1,167,584.

Patented Jan. 11, 1916.

WITNESSES:
René Quine
Fred White

INVENTOR:
Clarence G. Michalis,
By Attorneys,

UNITED STATES PATENT OFFICE.

CLARENCE G. MICHALIS, OF EAST ORANGE, NEW JERSEY, ASSIGNOR TO THE TORSION BALANCE COMPANY, OF NEW YORK, N. Y., A CORPORATION OF NEW YORK.

WEIGHING-SCALE.

1,167,584.  Specification of Letters Patent.  Patented Jan. 11, 1916.

Application filed June 9, 1915. Serial No. 33,044.

*To all whom it may concern:*

Be it known that I, CLARENCE G. MICHALIS, a citizen of the United States of America, residing in East Orange, in the county of Essex and State of New Jersey, have invented certain new and useful Improvements in Weighing-Scales, of which the following is a specification.

This invention relates to the adjustment of weighing scales, and has for an object to provide, through means of the same instrumentalities, correction of balance, and coarse and fine tare weight adjustment, and releasable holding of the weight in its position of adjustment.

Figure 1:
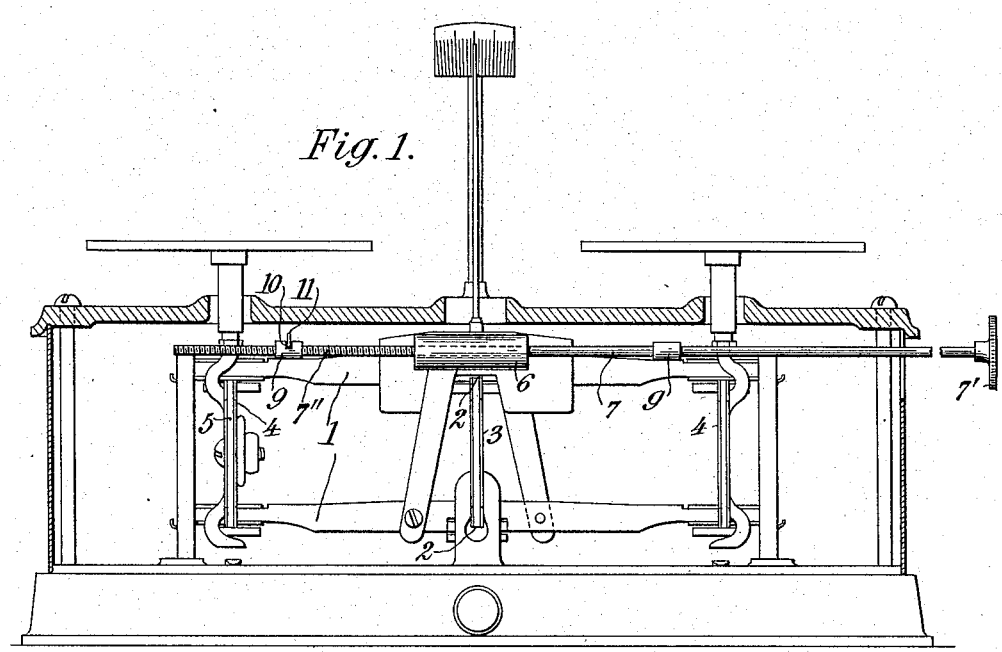
Figure 2:
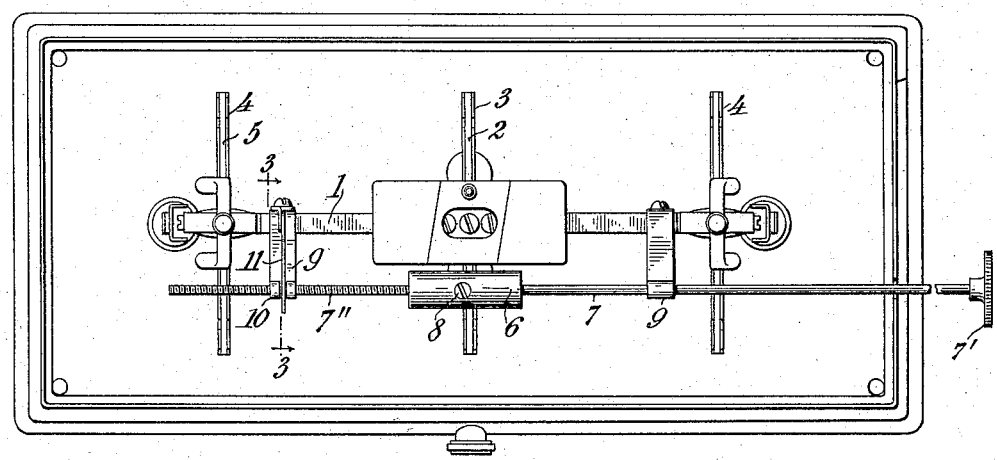
Figure 3:
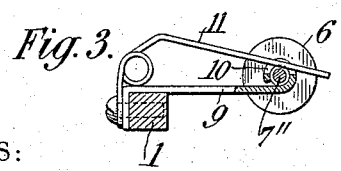

In the accompanying drawings, Figure 1 is a front elevation of a tosion balance scale equipped with an embodiment of my invention. In this view the housing is shown in longitudinal section. Fig. 2 is a plan view of the mechanism shown in Fig. 1, the top slab of the housing being removed, and Fig. 3 is a detail, shown on an enlarged scale, of the releasable nut.

My improvement is shown in the drawings in association with a torsion balance scale, not because such use is exclusive, but as a convenient mode of illustrating the principles of the invention in an employment wherein it has demonstrated its efficiency. The scale in the illustrative example comprises a pair of beams 1, resting at their centers on the tension wires 2 of the fulcrum truss 3, and at their ends supporting the pan carrying trusses 4, the connection being through the tension wires 5. The fulcrum truss is shown secured to a suitable base, which base carries the housing for the mechanism.

It is frequently necessary to correct the balance of weighing scales either by the manufacturer or the user. In the use of such scales adjustable tare weights are at times employed. For certain classes of work celerity and accuracy in a series of rapidly repeated adjustments of such a weight is demanded. A tare weight 6 is shown in the drawings, mounted on a bar 7, and held in position thereon by a set screw 8. The bar 7 is shown supported in brackets 9, 9, carried by the upper beam of the pair of beams 1, 1, and extending outside the housing and there provided with an actuating head or finger piece 7'. The influence of the weight is placed upon one or the other side of the fulcrum by a longitudinal movement which is effected by a longitudinal movement of the bar 7. Sudden tilting movements of the beam and other causes tend to move a tare weight in its support. The present improvement provides means which, while capable of holding the weight in its position of adjustment, also permits a quick or coarse and a fine adjustment.

The bar 7 is shown provided at one end, namely, that farthest from the actuator head, with a screw thread 7'' throughout that portion adapted to traverse the eye of its supporting bracket. The bracket is shown slotted at 10. In the slot moves the free end of a spring wire 11, which engages the screw threaded end of the bar, and causes a longitudinal traverse of the bar and weight upon rotation of the bar. The spring and screw thread also act as a ratchet upon the bar being shifted longitudinally while held from rotation. The pawl and rack function of the releasable nut is availed of for the quick or coarse adjustment, and the screw function for the fine adjustment. It will be seen that in the illustrated form both these adjustments may be effected from outside the housing.

The example of my invention shown in the drawings is illustrative and it is to be understood that changes may be made within the scope of my claims without departing from the spirit of my invention.

I claim as my invention:

1. The combination with a scale beam, of a tare balance comprising a weighted bar provided with a screw thread, and a releasable nut carried by the beam and engaging the screw thread for effecting quick and fine adjustment.

2. The combination with a fulcrumed scale beam, of supporting brackets carried by the beam at the respective sides of the fulcrum, a releasable nut carried by one of the said brackets, a weight, and a bar carrying the weight and mounted in said brackets and having a screw thread engaging the said releasable nut.

3. In a weighing scale, the combination with a housing, of a beam fulcrumed therein, supporting brackets carried by the beam at the respective sides of the fulcrum, a bar mounted in the said brackets and at one end extending outside the housing, an actuator carried by the said extending end, the other end of the bar being provided with a screw thread, a releasable nut carried by one of the said brackets and engaging the said screw thread, and a weight carried by the said bar.

4. The combination with a scale beam, of a weight bar provided with a screw thread, a supporting bracket carried by the beam and having an eye embracing such bar, the bar being slotted transversely of the eye, and a spring wire disposed in such slot and engaging the screw thread.

In witness whereof, I have hereunto signed my name in the presence of two subscribing witnesses.

CLARENCE G. MICHALIS.

Witnesses:
JOSEPH W. HOBAN,
MARIE C. PICART.